(12) United States Patent
Niebling et al.

(10) Patent No.: US 7,465,102 B2
(45) Date of Patent: Dec. 16, 2008

(54) BEARING RING AND WHEEL BEARING UNIT

(75) Inventors: Peter Niebling, Bad Kissingen (DE); Heinrich Hofmann, Schweinfurt (DE); Darius Dlugai, Schweinfurt (DE); Jens Heim, Schweinfurt (DE); Roland Langer, Schwanfeld (DE); Horst Doppling, Herzogenaurach (DE); Wolfgang Steinberger, Herzogenaurach (DE)

(73) Assignee: Schaeffler KG, Herzogenaurach (DE)

( * ) Notice: Subject to any disclaimer, the term of this patent is extended or adjusted under 35 U.S.C. 154(b) by 373 days.

(21) Appl. No.: 10/564,135

(22) PCT Filed: Jul. 8, 2004

(86) PCT No.: PCT/DE2004/001465

§ 371 (c)(1),
(2), (4) Date: Mar. 15, 2006

(87) PCT Pub. No.: WO2005/008085

PCT Pub. Date: Jan. 27, 2005

(65) Prior Publication Data

US 2006/0171624 A1 Aug. 3, 2006

(30) Foreign Application Priority Data

Jul. 10, 2003 (DE) ................. 103 31 180

(51) Int. Cl.
*F16C 19/18* (2006.01)
(52) U.S. Cl. ....................................... 384/544
(58) Field of Classification Search ................. 384/544, 384/512–516, 504; 301/105.1
See application file for complete search history.

(56) References Cited

U.S. PATENT DOCUMENTS

| 2,037,982 | A | * | 4/1936 | Hughes | 384/506 |
| 3,749,416 | A | * | 7/1973 | Asberg | 384/544 |
| 3,757,883 | A | * | 9/1973 | Asberg | 384/544 |
| 5,177,869 | A | * | 1/1993 | Andersson | 29/898.062 |

FOREIGN PATENT DOCUMENTS

| DE | 924 924 A | | 3/1955 |
| DE | 2636903 A | * | 2/1978 |
| EP | 1 031 439 A | | 8/2000 |
| GB | 2 298 685 A | | 9/1996 |
| JP | 07 317777 | | 12/1995 |
| JP | 09 151950 | | 6/1997 |
| JP | 2003025803 A | * | 1/2003 |

* cited by examiner

*Primary Examiner*—Thomas R Hannon
(74) *Attorney, Agent, or Firm*—Lucas & Mercanti, LLP

(57) ABSTRACT

The invention relates to a cold-formed bearing ring (2) and a wheel bearing unit (1) provided with a bearing ring (2). A radial ring groove (16) is formed on the bearing ring (2).

23 Claims, 4 Drawing Sheets

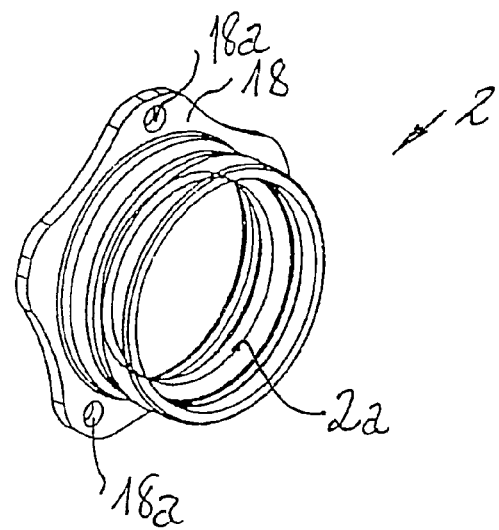
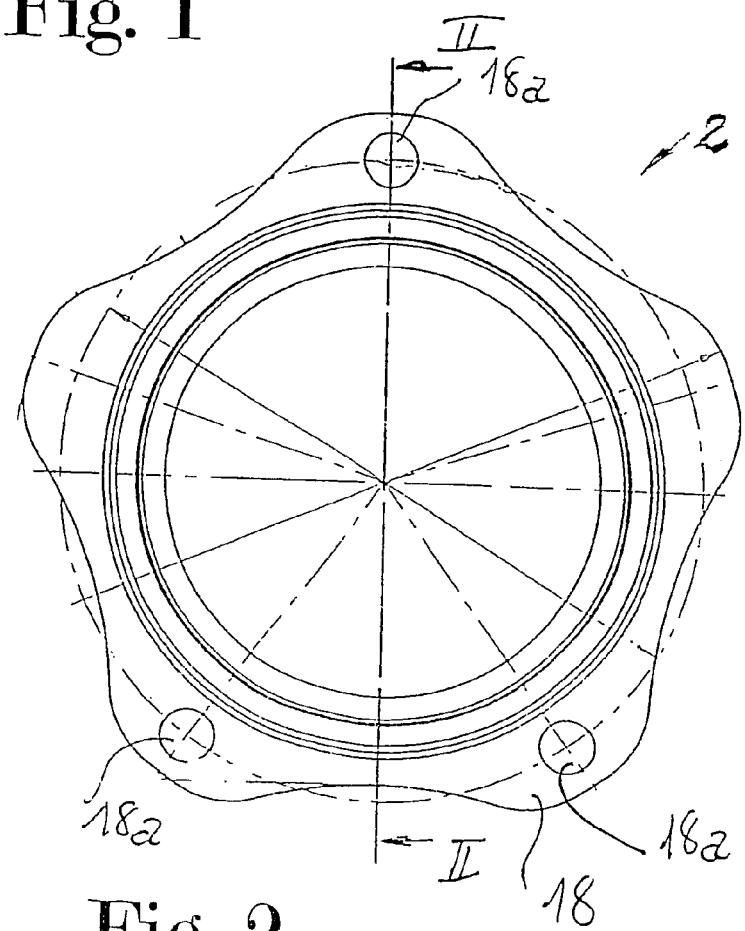
Fig. 1
Fig. 2

BEARING RING AND WHEEL BEARING UNIT

FIELD OF THE INVENTION

The invention relates to a bearing ring of a wheel bearing unit, said bearing ring being formed in one part from cold-formed sheet metal, and to a wheel bearing unit having a bearing ring of this type.

BACKGROUND OF THE INVENTION

U.S. Pat. No. 3,757,883 shows a wheel bearing unit, in which the inner and the outer bearing ring are cold-formed from sheet metal. The bearing rings are designed hollow-cylindrically about the axis of rotation of the wheel bearing unit and each have two raceways for rolling bodies. The outer bearing ring has, on its side facing away from the raceways, a radially outwardly directed flange, by means of which the wheel mounting is fixed with respect to the vehicle. The inner bearing ring is provided with a likewise outwardly directed connection flange, to which the brake disk and the vehicle wheel driven via the inner bearing ring are fastened. The raceways are introduced radially, at least partially recessed, into the respective bearing ring and are separated from one another by shoulders. The raceways of the double-row angular ball bearing run out at the shoulders projecting radially outwardly from the raceways.

The bearing rings, produced without cutting from sheet metal, are designed to have a very high mass. This has an adverse effect on the overall balance of the unsprung masses on the vehicle. Moreover, due to the thickness of its walls, the bearing rings are relatively rigid, so that an elastic compression of the bearing rings, which is sometimes desirable, is ruled out. On account of the high rigidity of the bearing rings, a bearing arrangement of this type can be prestressed, free of play, only with extremely great difficulty.

SUMMARY OF THE INVENTION

The object of the invention is, therefore, to provide a bearing ring for a wheel bearing unit, which bearing ring, by virtue of its installation in the wheel bearing unit, avoids the disadvantages mentioned above.

This object is achieved according to the subject matter of claim 1. A bearing ring of a wheel bearing unit is produced in one part essentially from formed sheet metal. The configuration of the bearing ring, together with all its shaped elements, is consequently generated solely by forming. Severing or chip-removing machining is limited only to a very slight extent of the machining operation, as compared with the extent of machining without cutting. Thus, only excess material, margins, burrs or the like are removed from the formed part by severing or punching. Where appropriate, only the raceways are reworked, with the removal of chips, by fine machining, such as grinding, lapping or polishing. The term "cold forming" is to be understood as meaning all forming methods in which the contour of the hollow bearing ring can be produced by stretching or upsetting, expansion or contraction and, at the same time, a plastic change in shape of the initial material, without material being severed. Methods of this type are, for example, drawing, deep-drawing, rolling, pressing and combinations of the abovementioned methods.

For example, tubes and sheets are provided as blanks for producing the bearing rings according to the invention. A blank consisting of a tube is machined into the finished bearing ring by expansion, rolling, contraction, upsetting and the folding of margins. Bearing rings according to the invention which are produced from sheet metal are produced by drawing and further individual methods mentioned above or combinations of the abovementioned methods. Preferred materials are cold-formable bearing materials, such as, for example, 100Cr6, or else all suitable deep-drawing steels.

The bearing ring has the following shaped elements generated by cold forming:

a basic body designed hollow-cylindrically about an axis of rotation of the wheel bearing unit, at least two raceways for rolling bodies, at least one flange emanating from the bearing ring radially with respect to the axis of rotation, the flange being produced in one part with the sheet metal of the bearing ring, a rim, the rim running axially between the raceways about the axis of rotation. The rim is likewise formed in one part from the material of the bearing ring and projects between the raceways radially toward the axis of rotation or away from the axis of rotation;

an annular groove; the annular groove radially adjoins the rim on a circumferential side of the bearing ring which faces away from the raceways. Said annular groove is formed, radially codirectionally with the rim, so as either to be recessed into the bearing ring from the inside outward or to be recessed into the bearing inner ring radially from the outside inward.

A bearing ring configured in this way is elastic in the load direction of the rolling bodies on account of the annular groove acting as a relief notch and can be subjected to extremely high load owing to the regulated texture of the material arising from manufacture without cutting. Furthermore, the bearing ring is distinguished by a low weight, since initial material having a small wall thickness or having a small sheet thickness is used. The thickness of the initial material is preferably in the range of 2.4 to 5 mm. The bearing ring is configured selectively as an outer bearing ring or as an inner bearing ring, although preference is given to the outer bearing ring in this invention.

Further refinements of the bearing ring are described in more detail in the following chapter "Detailed description of the drawings".

The invention provides a wheel bearing unit which has at least one of the bearing rings according to the invention. The wheel mounting has a double-row angular ball bearing, preferably in the O-arrangement. The wheel bearing unit according to the invention is formed at least by a bearing ring according to the invention and a supporting ring arranged concentrically with respect to the bearing ring and by rows of rolling bodies arranged between the supporting ring and the bearing ring. The rolling bodies are balls. In this case, selectively, both the bearing ring and the supporting ring have in each case two raceways for the balls. Alternatively to this, the wheel bearing unit is additionally provided with a flanged ring which receives a supporting ring with one raceway and on which a further raceway is formed directly.

BRIEF DESCRIPTION OF THE DRAWINGS

Further refinements of the invention and an embodiment of the invention are described in more detail in FIGS. 1 to 4 in which, in particular, FIG. 1 shows an overall view of a bearing ring according to the invention, FIG. 2 shows the bearing ring according to FIG. 1 in a front view.

DETAILED DESCRIPTION OF THE DRAWINGS

Figure 4:
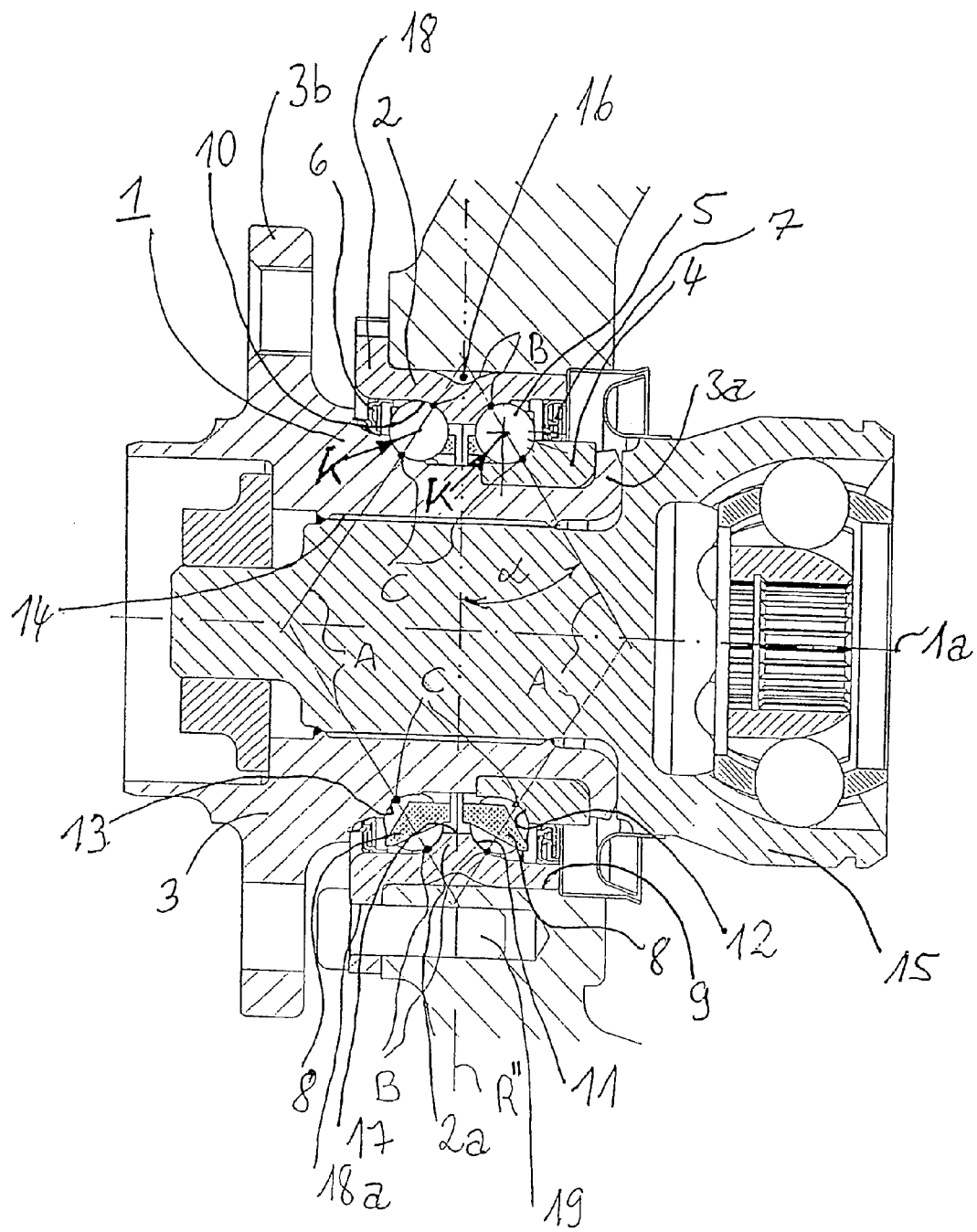
FIG. 4 shows a longitudinal section through a wheel bearing unit according to the invention which is fixed at least in terms of rotation on the vehicle.

FIG. 4 shows a wheel bearing unit 1 with a bearing ring 2 according to the invention for a driven and steered vehicle wheel. The bearing ring and the wheel bearing unit according to the invention are also provided, alternatively to this, for nondriven and/or nonsteered wheels. The wheel bearing unit 1, further, has a flanged ring 3, a supporting ring 4, two rows of rolling bodies 5 in the form of balls, and seals 6 and 7. Each of the rows of rolling bodies 5 is held and guided in each case by means of a cage 8.

The wheel bearing unit 1 is fixed in a bore 9 by means of the bearing ring 2 designed as an outer ring. For this purpose, the bearing ring 2 is pressed into the bore 9 and is radially contracted elastically to an extent such that the wheel bearing unit 1 is prestressed. The rolling bodies 5 are in this case supported toward one side, circumferentially on the inside of the bearing ring 2, on raceways 10 and 11 and in the other direction on raceways 12 and 13. The raceway 12 is formed on the supporting ring 4. The raceway 13 is introduced into the flanged ring 3. The raceways 11 and 12 or 10 and 13 are in each case arranged so as to be offset relative to one another in the direction of the axis of rotation 1a of the wheel bearing unit 1 and are formed at least partially on a rim 2a projecting radially out of the bearing ring 2 at least between the rows of rolling bodies 5.

Figure 3:
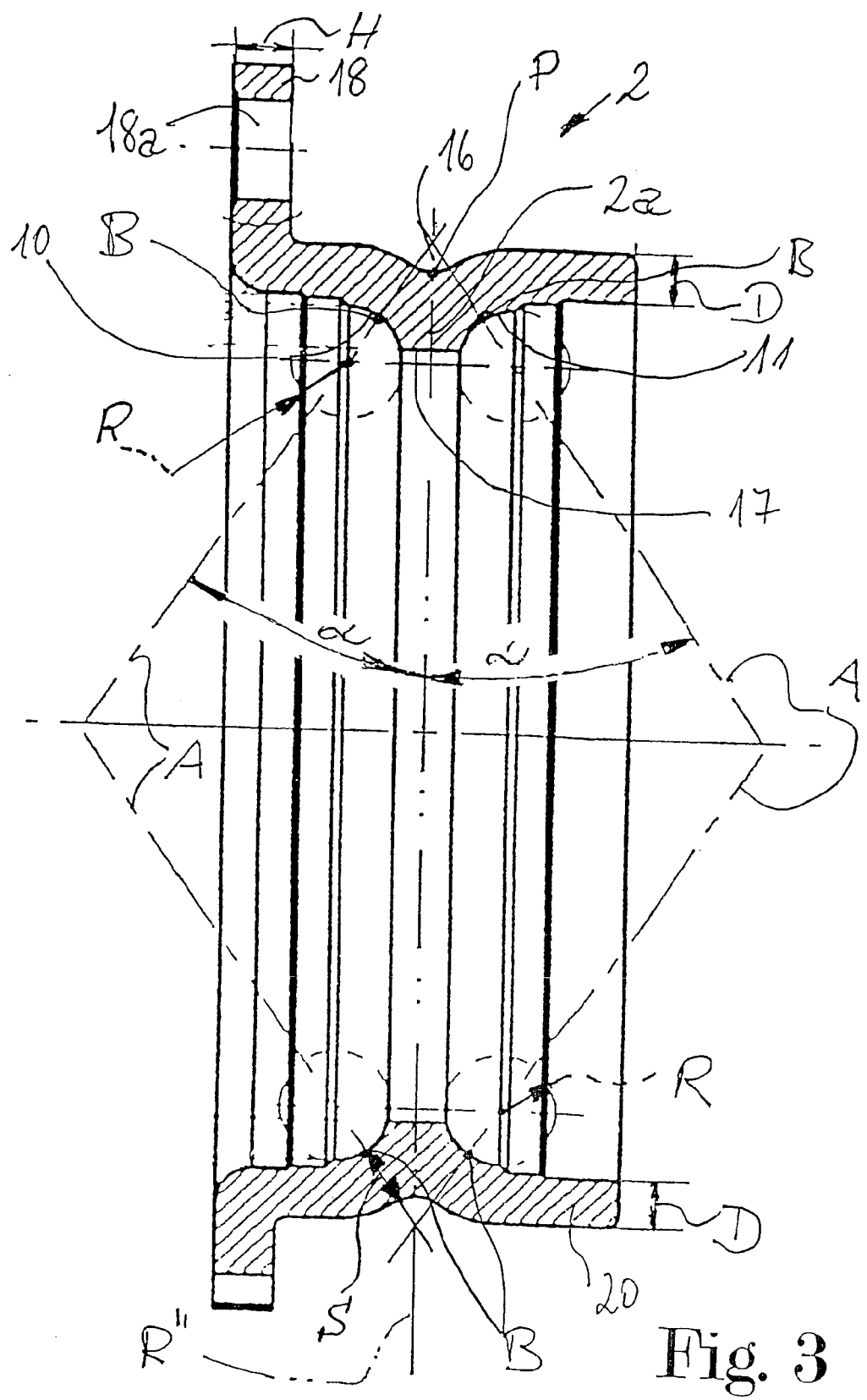
FIG. 3 shows the bearing ring according to FIG. 1 in a longitudinal section taken along the line II-II from FIG. 3.

The rows of rolling bodies 5 are arranged in what is known as an O-arrangement in relation to one another. In this O-arrangement, the intersection points of the contact lines A with the axis of rotation 1a of the respective rows are at an axial distance from one another. For an arrangement of this type, the pressure angle α is provided in a range of 20 to 45° (FIG. 3, FIG. 4). In this case, the pressure angle α is the angle which the connecting lines A between the two contact points B and C between the rolling bodies 5 and raceways 10 and 13 or 11 and 12 form with the imaginary radial plane R". It may also be noted, in this regard, that the rolling bodies 5 are not supported in a punctiform manner on the respective raceway 10, 11, 12 or 13, but fit snugly, at least under load, into a raceway 10, 11, 12 or 13. The raceways 10, 11, 12 or 13 are therefore provided with a groove radius R which is only slightly greater than the ball radius K of the rolling bodies 5. The [ratio], designated by specialists as "osculation", of groove radius R to ball radius K amounts preferably, at the raceways 10 and 11 on the outer ring, in this case on the bearing ring 2, to [1.055:1] and, on the inner raceways 12 and 13, in this case on the supporting ring 3 or on the flanged ring 3, to [1.035:1]. Consequently, in the event of osculation, the contact points B and C are the centerpoints of the contact or stand-on surfaces between rolling body and raceway, said centerpoints being pierced by the connecting lines A also known as "contact lines".

The flanged ring 3 is arranged rotatably about the axis of rotation 1a with respect to the bearing ring 2 fixed to the vehicle and in this case takes up the supporting ring 4. The supporting ring 4 is secured at least axially on the flanged ring 3 by means of a crimped rim 3a of the flanged ring, said crimped rim bearing against the supporting ring 4. The flanged ring 3 has projecting radially from it a connecting flange 3b to which a brake disk and the rim of a vehicle wheel are conventionally fastened. The flanged ring 3 is driven and, for this purpose, has on its inner circumference a serration 14, into which a driven drive element 15, not described in any more detail here, engages positively.

The bearing ring 2 is provided radially on the outside with an annular groove 16 (see also FIG. 3). The annular groove 16 adjoins the rim 2a radially on the outside. The invention also provides refinements in which the annular groove 16 extends radially into the rim 2a and even partially radially to between the rows of rolling bodies 5. On account of the annular groove 16, the bearing ring 2 is freely moveable elastically in the supporting directions identified by the run of the connecting lines A. The material of the bearing ring 2 is deformed elastically toward the annular groove 16 in the region of the raceways 10 and 11 under load, since, because of the annular groove 16, the bearing ring 2 is not supported radially at this point in the receptacle of the bearing ring 2. This is advantageous both during the elastic prestressing of the wheel bearing unit 1 upon installation and for the wheel bearing unit 1 when the vehicle is in operation, since overloads due to brief punctiform stress peaks in rolling contact are avoided.

The annular groove 16 is formed on the bearing ring 2 by the bearing ring 2 being contracted in the direction of the axis of rotation with respect to the rim 2a. The rim 2a, starting from the radially lowest point P (FIG. 3) of the annular groove 16, is radially thicker than the wall thickness of the initial material, the rim 2a pointing, radially opposite of the flange 18, inward in the direction of the axis of rotation 1a. A cylindrical outer surface area 17 pointing in the radial direction is formed on the inner circumference of the rim 2a. The rim 2a is, on the flank side, a shoulder for each of the raceways 10 and 11 and projects radially out of the bearing ring 2 beyond the raceways in the direction of the axis of rotation. The wall thickness of the bearing ring 2 at the thickest point S, between the annular groove 16 and the respective raceway 10 or 11, is at least as great as the wall thickness of the initial material. Moreover, the bearing ring 2 has a hollow-cylindrical portion 20, the wall thickness of which is lower than the wall thickness of the initial material (FIG. 3).

A flange 18 produced in one part with the bearing ring 2 projects outward from the bearing ring 2 radially. The flange 18 has introduced into it (FIGS. 1 and 2) passage holes 18a which are uniformly spaced apart from one another circumferentially and through which in each case a bolt 19 passes, as illustrated in FIG. 4. By means of the bolts 19, the bearing ring 2 is secured in the circumferential direction against micromovements and circumferentially and axially against creeping out of the bore 9. The bolts 19 are fixed with respect to the surrounding structure of the wheel bearing unit 1 by means of a press fit or alternatively by means of threads. The flange 18 has the thickness H of the initial material. The thickness or wall thickness of the initial material is defined as a function of the blank used for producing the bearing and comes under the common term "thickness". Sheet metals or tubes are provided as blanks. The term "thickness" is assigned to the sheet metal and the term "wall thickness" to the tube as initial material.

Figure 5:
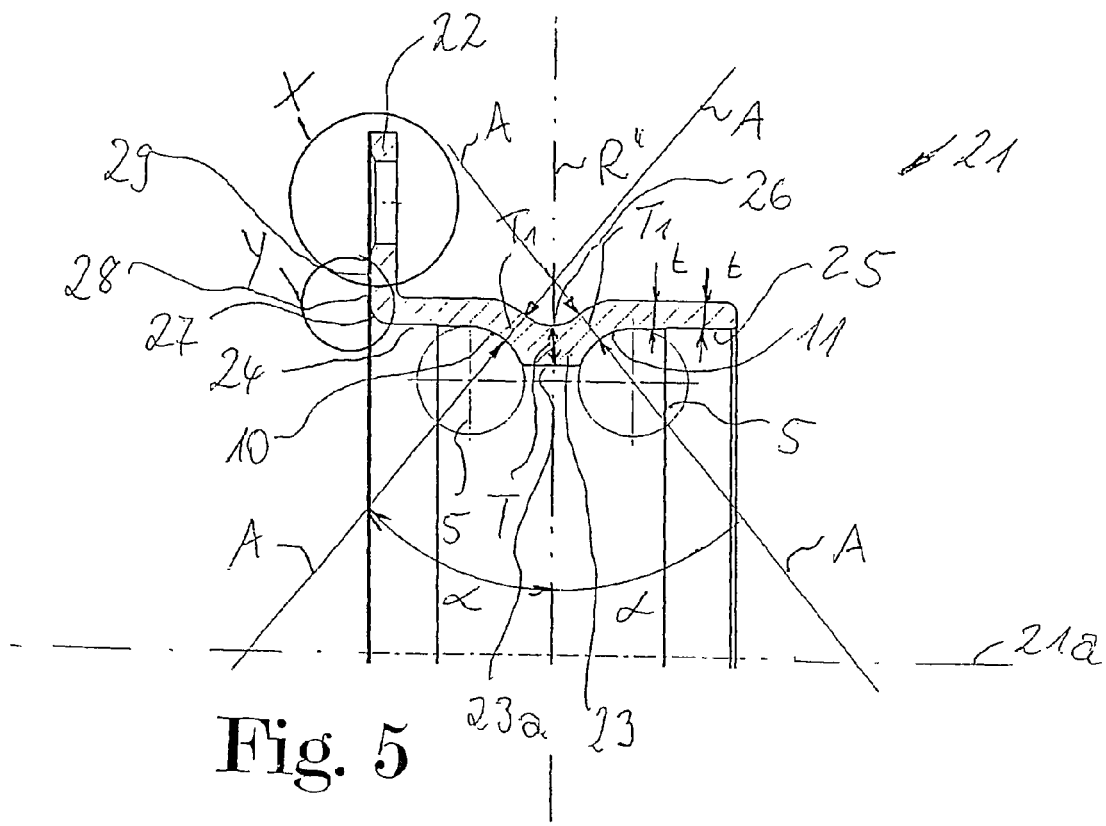
FIG. 5 shows a further exemplary embodiment of a bearing ring according to the invention in longitudinal section.

A further exemplary embodiment of a bearing ring 21 is illustrated in FIG. 5. The bearing ring 21 is produced in one part with a flange 22. The bearing ring 21 has the raceways 10 and 11 on its inner circumference. The raceways 10 and 11 are partially formed on a rim 23. The rim 23 is thus provided on each of the two sides with a shoulder for the support of rolling bodies 5. The rim 23-projects radially inward in the direction of the axis of rotation 21*a* and has a cylindrical outer surface area 23*a* pointing toward the axis of rotation 21*a*. An annular groove 26 adjoins the rim 23 radially on the outside. The bearing ring 21 merges axially on each of the two sides into a hollow-cylindrical portion 24 and 25 axially adjoining the raceway 10 and raceway 11 respectively. The radially greatest wall thicknesses t of the hollow-cylindrical portions 24 and 25 are lower than the smallest radial distance T between the radially lowest point $P_1$ in the annular groove 26 and the cylindrical outer surface area 23*a*.

The contact lines A running through the raceways 10 and 11 penetrate the plane R" running centrally through the annular groove axially and form the pressure angles α between themselves and the plane R". The lowest wall thickness $T_1$, codirectional with the run of the contact lines A, of the rim 23 is greater in the region of the raceways 10 and 11 than the radially greatest wall thickness t of the hollow-cylindrical portions 24 and 25. The contact lines A emerge outward from the bearing ring 23 in the annular groove 26.

Figure 6:
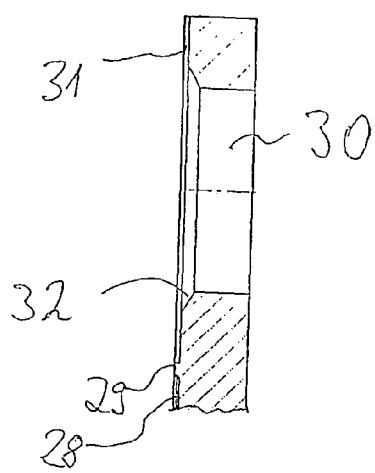
FIG. 6 shows the detail X of the bearing ring according to FIG. 5 in an enlarged illustration.
Figure 7:
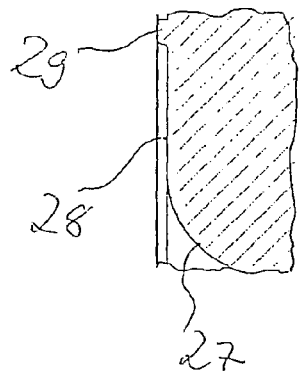
FIG. 7 shows the detail Y of the bearing ring according to FIG. 5 in an enlarged illustration.

The hollow-cylindrical portion 24 merges into the flange 22 via an edge rounding 27 (FIG. 7). The edge rounding 27 runs out in an annular planar surface 28. The planar surface 28 is peripherally delimited, radially on the outside, by a projection 29 projecting axially from the flange 23. The projection 29 runs radially between the planar surface 28 and three flange holes 30 introduced in the flange 22. The flange holes 30 are passage holes emanating from at least one further planar surface 31. As illustrated in FIG. 6, the planar surface 31 either lies on the same plane as the planar surface 28 or runs parallel to the latter in another plane. The passage holes are in each case provided with a chamfer 32 at the transition to the planar surface 31.

REFERENCE SYMBOLS

1 Wheel bearing unit
1*a* Axis of rotation
2 Bearing ring
2*a* Rim
3 Flanged ring
3*a* Crimped rim
3*b* Connecting flange
4 Supporting ring
5 Rolling body
6 Seal
7 Seal
8 Cage
9 Bore
10 Raceway
11 Raceway
12 Raceway
13 Raceway
14 Serration
15 Drive element
16 Annular groove
17 Outer surface area
18 Flange
18*a* Passage hole
19 Bolt
20 Portion
21 Bearing ring
21*a* Axis of rotation
22 Flange
23 Rim
23*a* Outer surface area
24 Portion
25 Portion
26 Annular groove
27 Edge rounding
28 Planar surface
29 Projection
30 Flange hole
31 Planar surface
32 Chamfer

The invention claimed is:

1. An at least partly cold-formed bearing ring of a wheel bearing unit,
   wherein the bearing ring is designed hollow-cylindrically about an axis of rotation of the wheel bearing unit, comprising
   at least two raceways for rolling bodies,
   a flange emanating radially with respect to the axis of rotation,
   a rim, the rim running axially about the axis of rotation between the raceways and projecting radially out of the bearing ring between the raceways, and
   an annular groove that is curvilinear in profile as viewed along a plane that contains the axis of rotation, wherein the annular groove acts as a stress relief notch, the annular groove adjoining the rim radially on a circumferential side of the bearing ring facing away from the raceways and the annular groove extending, radially codirectionally with the rim, at least partially radially into the bearing ring.

2. The bearing ring as claimed in claim 1, which is contracted radially inward in the direction of the axis of rotation with respect to the rim.

3. The bearing ring as claimed in claim 1, in which the rim, starting from a radially innermost point in the annular groove, is radially thicker than the flange.

4. The bearing ring as claimed in claim 1, in which the rim has between the raceways a cylindrical outer surface area pointing in the radial direction.

5. The bearing ring as claimed in claim 4, which merges axially on both sides of the rim into hollow-cylindrical portions, in each case one of the portions adjoining in each case one of the raceways on both sides of the rim, and the radially greatest wall thicknesses of the portions being lower than the smallest radial distance between the cylindrical outer surface area and a radially lowest point in the annular groove.

6. The bearing ring as claimed in claim 1, in which the rim has in each case a shoulder for each of the raceways.

7. The bearing ring as claimed in claim 6, in which the raceways are formed at least partially on the rim.

8. The bearing ring as claimed in claim 6, in which the rim projects out of the bearing ring radially beyond the raceways.

9. The bearing ring as claimed in claim 8, with imaginary contact lines which run through the raceways and which at least partially penetrate an imaginary plane pierced perpendicularly by the axis of rotation, the contact lines being inclined at an acute pressure angle to the plane, and in this case the plane running through the annular groove.

10. The bearing ring as claimed in claim 9, which merges axially on both sides of the rim into hollow-cylindrical portions and, in this case, in each case one of the portions adjoining in each case one of the raceways on both sides of the rim, and the lowest wall thickness of the rim being greater in the direction of the contact lines than the radially greatest wall thicknesses of the portions.

11. The bearing ring as claimed in claim 9, in which the contact lines penetrate the annular groove.

12. The bearing ring as claimed in claim 1, which is of greater thickness, between the annular groove and at least one of the raceways, than it is in adjacent portions of the bearing ring.

13. The bearing ring as claimed in claim 1, which has on at least one hollow-cylindrical portion a radial wall thickness which is lower than that of the flange.

14. The bearing ring as claimed in claim 1, in which the flange comprises flange holes arranged so as to be distributed about the axis of rotation.

15. The bearing ring as claimed in claim 14, in which the flange has an annular planar surface and a projection projecting axially from the flange beyond the planar surface and running around the axis of rotation.

16. The bearing ring as claimed in claim 15, in which the projection runs radially between the planar surface and the flange holes.

17. A wheel bearing with a bearing ring as claimed in claim 1, with two rows of rolling bodies, in each case one of the rows being in rolling contact with one of the raceways, the wheel bearing unit, further, with at least one supporting ring, the supporting ring being arranged concentrically to the bearing ring and being in rolling contact with at least one of the rows of rolling bodies.

18. The wheel bearing unit as claimed in claim 17, with a flanged ring on which the supporting ring is seated concentrically, the flanged ring having at least one connecting flange spaced apart axially from the flange and radially codirectional with the flange.

19. The wheel bearing unit as claimed in claim 18, which has in the flanged ring a raceway, further to the raceways, for rolling contact with one of the rows of rolling bodies.

20. The wheel bearing unit as claimed in claim 19, in which the supporting ring is held axially on the flanged ring by means of a crimped rim cold-angled from the flanged ring and bearing axially against the supporting ring.

21. The wheel bearing unit as claimed in claim 17, wherein the bearing ring is elastically deformable and wherein the wheel bearing unit is play-free at least by means of the at least elastically deformed bearing ring.

22. The wheel bearing unit as claimed in claim 21, in which the flange has at least one axial passage hole, a bolt passing axially through the passage hole, and the bearing ring being fixed by means of the bolt axially and in terms of rotation about the axis of rotation.

23. An at least partly cold-formed bearing ring of a wheel bearing unit,
wherein the bearing ring is designed hollow-cylindrically about an axis of rotation of the wheel bearing unit, comprising
at least two raceways for rolling bodies,
a flange emanating radially with respect to the axis of rotation,
a rim, the rim running axially about the axis of rotation between the raceways and projecting radially out of the bearing ring between the raceways, and
an annular groove, the annular groove adjoining the rim radially on a circumferential side of the bearing ring facing away from the raceways, and the annular groove extending, radially codirectionally with the rim, at least partially radially into the bearing ring;
wherein the bearing ring merges axially on both sides of the rim into hollow cylindrical portions, in each case one of the portions adjoining one of the raceways in each case on both sides of the rim, and wherein the rim, starting from a radially lowest point in the annular groove, is radially thicker than the radially greatest wall thickness of the hollow cylindrical portions.

* * * * *